March 3, 1970   H. W. JAHN ET AL   3,498,636
TRACTOR-TRAILER HITCH
Filed July 31, 1967   4 Sheets-Sheet 1
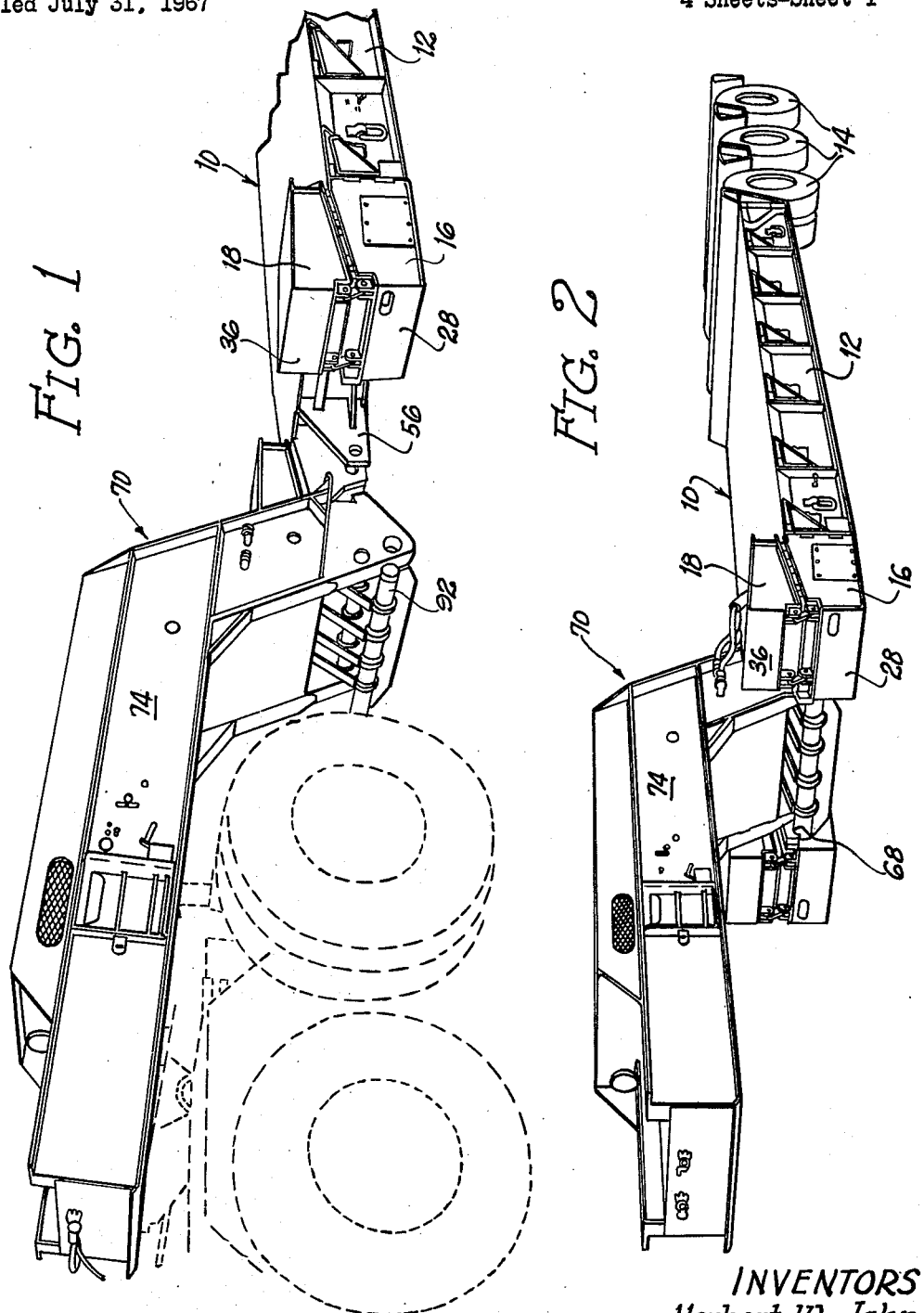
INVENTORS
Herbert W. Jahn
John J. Dorwin
by McDougall, Hersh, Scott
and Ladd
Attys March 3, 1970 H. W. JAHN ET AL 3,498,636
TRACTOR-TRAILER HITCH
Filed July 31, 1967 4 Sheets-Sheet 2

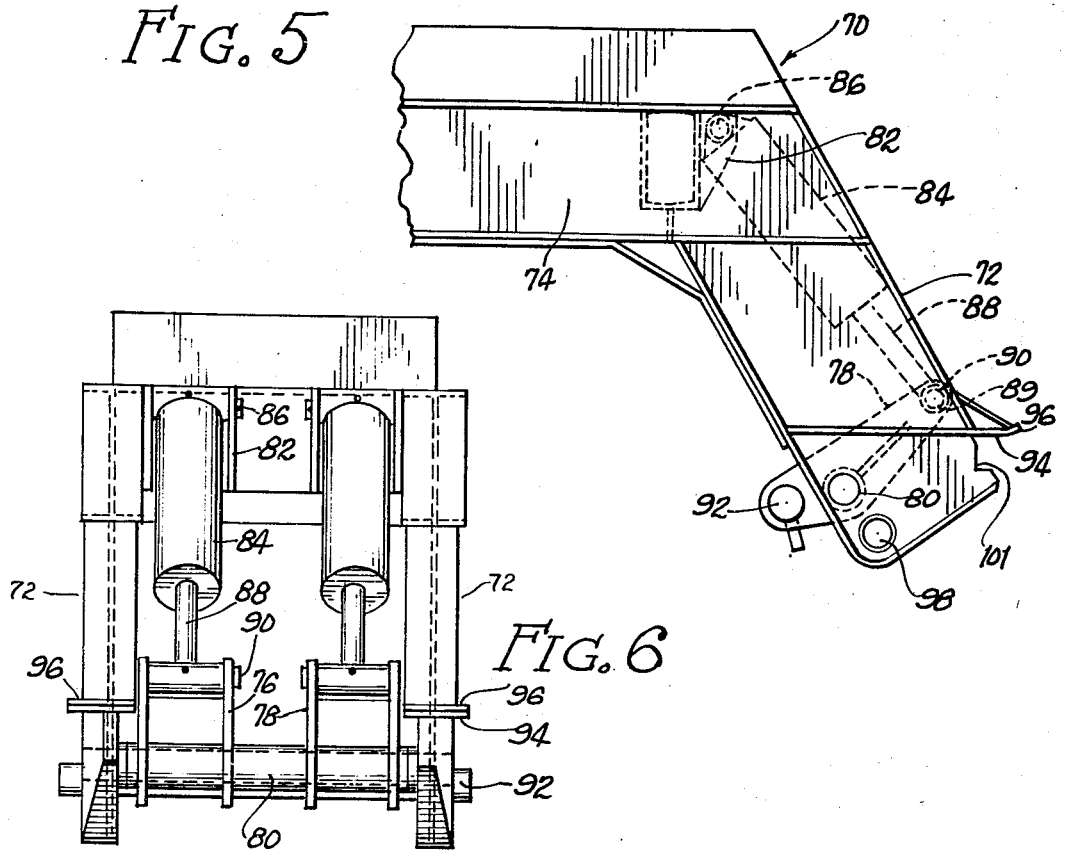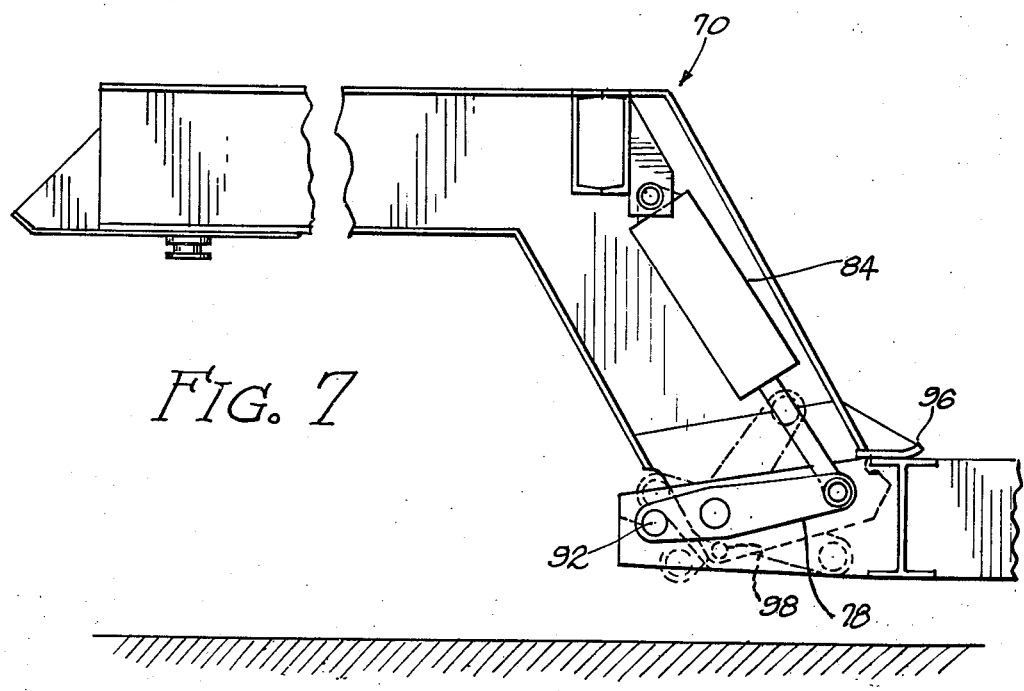

March 3, 1970    H. W. JAHN ET AL    3,498,636
TRACTOR-TRAILER HITCH

Filed July 31, 1967    4 Sheets-Sheet 4

3,498,636
TRACTOR-TRAILER HITCH
Herbert W. Jahn, Cedar Rapids, and John J. Dorwin, Hiawatha, Iowa, assignors to Transport Trailers, Inc., Cedar Rapids, Iowa
Filed July 31, 1967, Ser. No. 657,299
Int. Cl. B62d 53/06; B60p 1/04
U.S. Cl. 280—425     20 Claims

ABSTRACT OF THE DISCLOSURE

A means for releasably interconnecting the forward end of a heavy duty trailer with the rearward end of a gooseneck or other traction means in which the gooseneck has laterally spaced apart upright members and in which the means for interconnection comprises rocker arms mounted between the uprights for rocking movement about a horizontal axis between raised and lowered positions, power means carried by the gooseneck and operatively connected to the rocker arms for actuation thereof between raised and lowered positions, a lift bar on one end portion of said rocker arms for displacement by said rocker arms between raised and lowered positions and anchoring means on the forward end portion of said uprights spaced rearwardly from the lift bar in position to engage the forward end portion of the trailer to limit relative upward movement of the trailer or relative downward movement of the uprights when in engaged position and in which the forward end portion of the trailer is provided with outer horn members extending forwardly from the trailer in laterally spaced apart relation with downwardly facing hook sections on the forward end portions of the horns in the path of the lift bar when the elements are in their interconnected relation whereby, when the rocker arms are rocked in the direction to raise the lift bar, the latter comes into engagement with the hook means for effecting a change in the angular relation between the gooseneck and trailer to raise the forward end portion of the trailer, and means for releasably interlocking the trailer and gooseneck in their raised position.

---

This invention relates to heavy-duty trailers of the type used for the transportation of heavy machines and equipment, and more particularly to the means for interconnection of the leading end portion of the trailer to the trailing end portion of a gooseneck or other tractor or towing means and elements included within the interconnection for raising or lowering the end of the trailer with reference to the ground.

It is an object of this invention to provide fluid, winch, or cable operated means for actuation of the elements for lifting and lowering the trailer and for interconnecting the trailer to the gooseneck or other towing means, and it is a related object to provide an assembly of the type described in which the raising and lowering movement of the trailer is effected by interconnection between elements on the gooseneck and trailer, as distinguished from operative engagement with the ground.

Another object is to provide a new and improved hitching mechanism for interconnecting the trailer with the tractor or gooseneck in which the elements are simple in construction and easy in operation, in which the elements become self-aligned during operation properly to interconnect the trailer and gooseneck, in which an interconnected relationship is automatically established without excessive load or strain on the operating mechanism, in which actuation of parts is effected by cable, winch and preferably hydraulically operated power means readily available from the tractor, in which irregularity in the ground surface or other supporting surface has little, if any, effect on the operation of the mechanism properly to connect the trailer to the gooseneck, in which interengagement or disengagement between gooseneck and trailer can be effected in a simple and efficient manner without the use of pins, in which the inadvertent omission of acts on the part of the operator has no effect on the reliability of the interconnection, and in which the interconnected relationship can be maintained independent of vibrational forces generated during use.

These and other objects and advantages of this invention will hereinafter appear, and, for purposes of illustration, but not of limitation, an embodiment of the invention is shown in the accompanying drawings, in which:

FIG. 1 is a perspective view of the arrangement of elements on the forward end of the trailer and the rearward end of the gooseneck, embodying the elements of this invention;

FIG. 2 is a perspective view similar to that of FIG. 1 showing the elements in their interconnected relation;

FIG. 5 is a side elevational view of the rearward end portion of the gooseneck;

FIG. 6 is an end elevational view of the gooseneck portion shown in FIG. 5;

FIG. 7 is a side elevational view of the gooseneck and trailer illustrating the interconnection between the parts when in the interconnected relation but with a modification in the rocker arm;

The invention will hereinafter be described with reference to the means and method for releasably interconnecting the forward end of a heavy duty trailer to the rearward end portion of a gooseneck pivotally supported, in the usual manner of a removable gooseneck, on the rearward platform of a tractor, reference being made to the Meadows U.S. Patent No. 2,545,584 and Talbert U.S. Patent No. 2,489,112. It will be understood that the gooseneck may otherwise comprise the rearward end portion of a truck, tractor, or other towing means, hereinafter collectively referred to as a "gooseneck" for purposes of simplification, since the gooseneck, tractor, or other towing means forms no part of the invention except as to the elements on the rearward end thereof for connection to the trailer, as will hereinafter be described.

Figure 4:
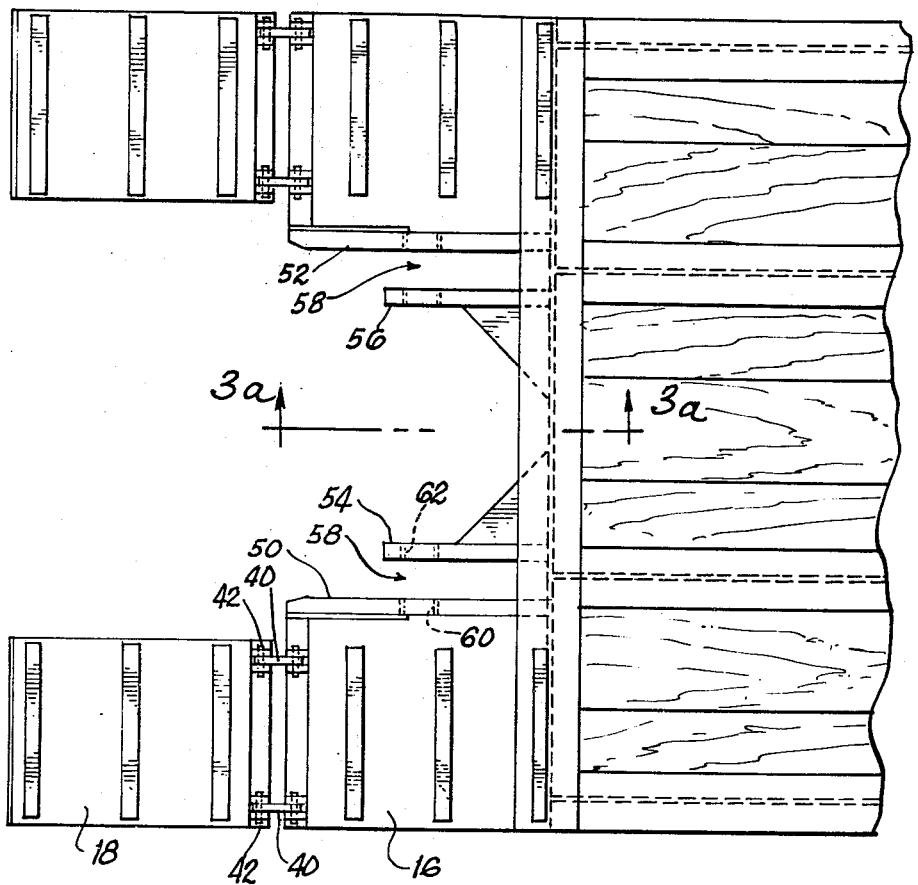
FIG. 4 is a top plan view of the forward ramp end portion of the trailer shown in FIG. 3.
Figure 3:
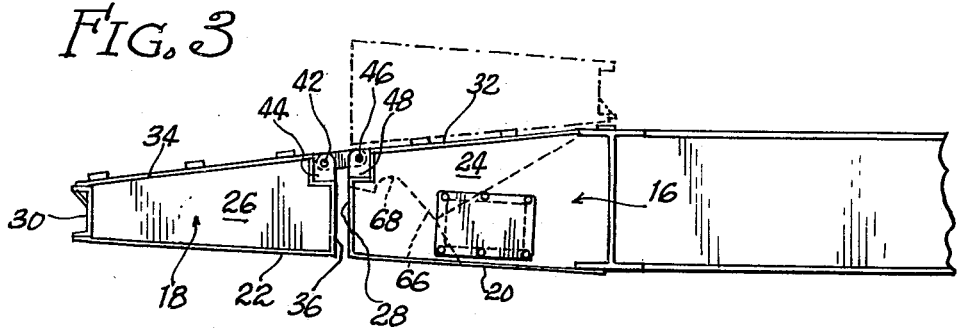
FIG. 3 is a side elevational view of the forward ramp end portion of the trailer.
Figure 3A:
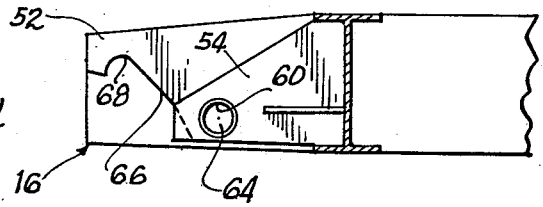
FIG. 3a is a sectional view taken along line 3a—3a of FIG. 4.

Referring now to FIGS. 2, 3, and 4 of the drawings, the trailer is of conventionl construction having an elongate flat trailer bed 10 supported on a rigid metal frame 12 with the rearward end portion suspended on wheels 14 mounted on axles for free rotational movement.

The forward end portion of the trailer is provided with a ramp in the form of a first section 16 which is rigid with the trailer frame and merely forms extensions thereof and outer sections 18 which are adapted to be folded between extended position, shown in FIG. 3, as a continuation of the ramp and folded position, shown in FIG. 2, wherein the outer section is folded back onto the top of the first section 16.

The sections 16 and 18 are each provided in the form of pairs of lesser width than the trailer bed, and in endwise alignment with the sides of the trailer. The ramp sections of each pair are spaced apart by an amount corresponding somewhat to the spaced relationship between the wheels or tracks of the machinery or equipment, so that the machinery or equipment can be displaced over the ramp onto or off of the bed of the trailer.

In the illustrated modification, the first ramp sections are dimensioned to have a greater width than the outer foldable ramp sections. Each ramp section is formed of a ramp base 20 and 22, ramp side walls 24 and 26, ramp end faces 28 and 30, ramp cover plates 32 and 34, which define a gradual inclined ramp surface therebetween when in extended position, and a ramp rear face 36 on the second outer ramp section 18.

The rearward end portions of the outer ramp sections 18 are pivoted to the forward end portions of the first ramp sections 16 at their adjacent upper ends. For such purpose, use is made of laterally spaced-apart linking plates 40 pivoted at one end on pivot pins 42 extending crosswise between brackets 44 rigid with the second sections 18 and pivoted at their other ends on pivot pins 46 extending crosswise between brackets 48 rigid with the first ramp sections 16. The outer ramp sections 18 are thus free for rocking movement relative the inner ramp sections between folded and extended positions.

Rigid with the trailer frame and extending forwardly thereof alongside the inner ramp sections 16 are a pair of laterally spaced-apart outer horns 50 and 52 and a pair of laterally spaced-apart inner horns 54 and 56, with the outer horns 50 and 52 being dimensioned to have a length greater than the inner horns to extend beyond the inner horns, and with the spaced relationship between the inner horns being less than the spaced relationship between the outer horns to provide a slotted portion 58 therebetween. An opening 60 is provided through an intermediate portion of each of the outer horns 50 and 52 and an opening 62 is provided through an intermediate portion of each of the inner horns 54 and 56 in crosswise alignment with the openings 60 to enable insertion of a locking pin 64 through the aligned openings.

The outer end of the outer horns is formed with a tapered cam edge 66 which extends angularly forward from the lower edge and terminates in a curvilinear recessed portion 68 spaced a short distance inwardly from the forward end and below the upper edge of the horn to define a downwardly extending hook.

Referring now to FIGS. 5 and 6 of the drawing, the rearward end portion of the gooseneck 70 is formed with a pair of laterally spaced-apart rigid upright members 72 which extend angularly downwardly and rearwardly from the gooseneck frame 74 in which the uprights are laterally spaced apart one from the other by an amount corresponding to the spaced relationship between the slotted portions 58 between the inner and outer horns on the trailer and in which the thickness of the uprights are dimensioned to be less than the spaced relationship between the outer and inner horns to enable the uprights to be displaced into the slotted portions 58 between the horns.

Two pairs of laterally spaced-apart rocker arms 76 and 78, arranged within the space between the uprights, are pivoted intermediate their ends on a pivot pin 80, in the form of a tubular member which extends horizontally crosswise between the lower end portions of the uprights 72 for supporting the rocker arms for rocking movement about a horizontal axis. For this purpose, each rocker arm is provided with crosswise aligned openings in an intermediate portion through which the pivot shaft extends for rocking movement about the horizontal axis.

Rocking movement of the rocker arms between raised and lowered positions is adapted to be effected by power-operated means such as a fluid motor in the form of an air or hydraulic fluid-operated piston and cylinder arrangement having a bracket 82 on the end of each cylinder 84 connected for pivotal movement on a horizontally disposed stud 86 fixed to the gooseneck frame. The outer end of the piston rod 88 is fixed to a shaft 90 rotatably secured in crosswise aligned openings 89 through one end of the rocker arms rotatably to connect the shafts 90 to the one end of the rocker arms. The other end of the rocker arms, beyond the pivot, supports a crosswise extending lift bar 92 dimensioned to have a length greater than the spaced relationship between the rocker arms to extend therebeyond and specifically dimensioned to have a length corresponding to the spaced relationship between the outer side-wall portions of the outer horns 50 and 52 on the trailer, so that the end portions of the lift bar 92 will engage the cam edges 66 of the outer horns for camming engagement therewith during movement into and out of the downwardly facing hook portions 68 at the upper end of the cam edges 66 of the outer horns.

It will be understood that instead of the pairs of rocker arms described, it will be sufficient to make use of but a single rocker arm or preferably a pair of rocker arms spaced laterally apart for movement of the attached lift bar and that actuation of the rocker arms can be effected by power means other than an air or hydraulic cylinder and piston arrangement, although the latter is preferred because of the availability of fluid under pressure from the tractor motor.

In addition to the pivoted support of the rocker arms, the uprights include a pair of laterally spaced-apart shoes or plates 94 which extend substantially horizontally rearwardly from the rearward edge of the uprights at a level calculated to correspond to the surface of the trailer bed while resting on the ground with the shoes being formed with an up-turned rearward end portion 96 for guiding the shoes into engagement with the upper surface of the trailer bed as the gooseneck is backed into position for interconnection of the trailer with the gooseneck.

A lock pin opening 98 is provided in crosswise alignment in the lower forward end portions of each of the uprights 72 below the rocker arm pivot 80. The lock pin openings 98 are adapted to be raised into crosswise alignment with the lock pin openings through the inner and outer horns when in position for attachment to enable insertion of a lock pin laterally therethrough to secure the members in their interconnected relationship as will hereinafter be described. Also, the rearward edge of the uprights, immediately below the shoes, are provided with recessed portions 101 adapted to be engaged by the forward edge of the trailer frame when the gooseneck is backed into position for attachment, thereby to indicate and to maintain the elements in their proper position for interconnection, as indicated in FIG. 7.

Figure 8:
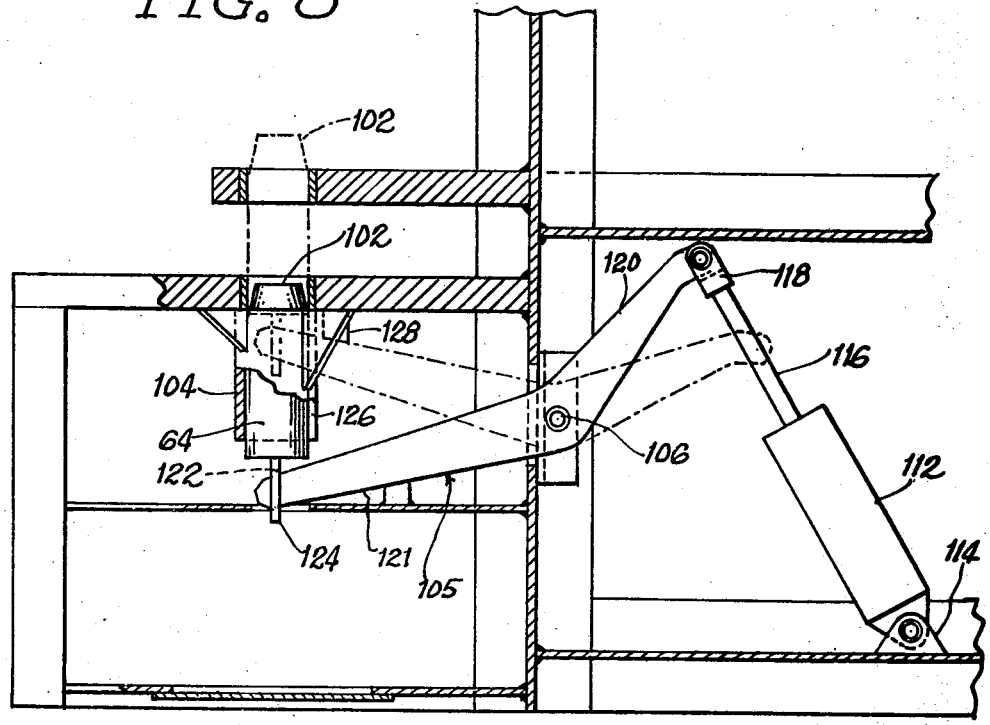
FIG. 8 is a top plan view of the arrangement of elements associated with the lock pin and its operation.
Figure 9:
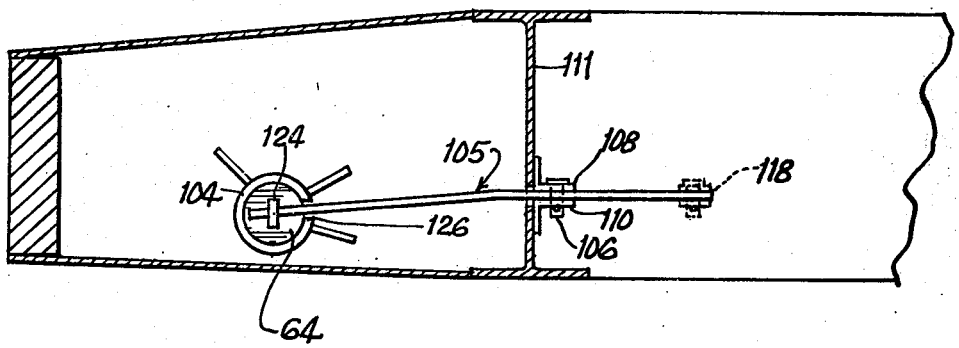
FIG. 9 is a side elevational view of a portion of the elements shown in FIG. 8.

Interconnection between the gooseneck uprights and the inner and outer horns on the trailer is adapted to be effected by means of lock pins or bolts insertable laterally through the aligned openings 60 and 62 of the horns and 98 of the uprights. As illustrated in FIGS. 8 and 9, the lock pin comprises an elongate pin 64 having a tapered or conically shaped end portion 102. The pin is slidably received in an elongate longitudinally disposed tubular member 104 fixed to the outer wall of each of the outer horns with the bore of the tubular member in registry with the openings 60 and 62 of the horns.

Means are provided for displacement of the lock pin between retracted position within the tube (see broken lines in FIG. 8) and extended position in which a substantial length of the pin extends inwardly beyond the tube 104 for projection through the aligned openings of the inner and outer horns (see solid lines in FIG. 8).

One such actuating means, illustrated in FIGS. 8 and 9 of the drawings, comprises a horizontally disposed bell crank lever 105 pivoted intermediate its ends for rocking movement about a vertical axis on a yoke pin 106 rotatably extending through vertically aligned openings in vertically spaced bracket plates 108 and 110 fixed to vertically spaced portions of a bulkhead member 111 rigid with the trailer frame. The bell crank lever 105 is adapted to be rocked about its pivot by power means comprising a fluid-operated cylinder 112 and piston arrangement in which the base of the cylinder is pivoted onto a bracket 114 fixed to a lateral frame member while the end of the piston rod 116 is provided with a bracket 118 for pivotal connection to the end portion of the arm 120 of the bell crank lever. The end portion of the other arm 121 extends through a slot 122 in a lock pin bar 124 extending outwardly from the base of the locking pin 64. The locking pin is displaced laterally between extended and retracted positions responsive to rocking movement of the bell crank lever 105 in the clockwise and counterclockwise directions respectively which in turn is responsive to the displacement of the piston rod between retracted and extended positions respectively. A side wall of the guide tube 104 is formed with an elongate slot 126 dimensioned to enable displacement of the lever arm portion 121 therethrough for actuation of the pin between extended and retracted position, and a stop bar 128 is fixed to the outer wall of each of the outer horns to lie in the path of the lever arm 121 for purposes of arresting the arm when the pin has been displaced to extended position.

Having described the construction and arrangement of elements, illustration will now be made of the operation thereof for connecting and disconnecting the trailer with the gooseneck.

Normally, the trailer is loaded or unloaded with the foldable ramp section 18 in extended position to form an inclined runway for movement of the equipment onto or off of the trailer bed 10.

When it is desired to hook the trailer onto the gooseneck for transporting, the foldable ramp sections 18 are folded back onto the ramp sections 16. The tractor is backed onto the trailer with the laterally spaced-apart uprights 72 entering the laterally spaced openings 58 between the inner and outer horns 50–54 and 52–56. During continuing rearward movement of the tractor and its supported gooseneck 70, the shoes 94 ride onto the upper surface of the trailer bed until the leading end of the trailer frame comes into engagement with the tip stop 101 provided in the edge of the upright below the shoes 94.

With the gooseneck and trailer thus aligned, pressure fluid is supplied to the cylinder 84 mounted on the gooseneck to extend the piston 88, whereby the rocker arms 76 and 78 are rocked in the clockwise direction about their pivot to raise the lift bar 92 on the opposite end of the rocker arms. The lift bar 92 rises into engagement with the downwardly faced recessed or hook portions 68 in the outer horns 50 and 52 to effect interengagement between the lift bar 92 carried by the gooseneck and the horns 50 and 52 rigid with the forward end of the trailer. While the shoes 94 rest on the upper surface of the trailer bed to prevent downward displacement of the gooseneck relative the trailer, or rising movement of the trailer relative the gooseneck, continued movement of the rocker arms further to raise the lift bar results in a change in the angular relationship between the gooseneck and trailer. Since the rearward end of the gooseneck rests on the forward end of the trailer, the change in angular relationship causes the trailer platform to rise whereby the forward end will be lifted off the ground until the trailer bed is level. The angle is adjusted by the rocker arms until the lock pin openings 98 in the uprights are crosswise aligned with the lock pin openings 60 in the outer horns and the lock pins 62 in the inner horns.

Pressure fluid communicating with the lock pin actuating cylinder 112 renders the power source effective to displace the piston rod 116 to retracted position. This rocks the bell crank lever in the clockwise direction about its pivot to displace the arm 121 inwardly through the tube slot 126 to project the lock pin 64 laterally through the aligned openings of the inner and outer horns and the uprights sandwiched therebetween. As the lock pin is rammed home, arm 121 comes into engagement with the stop 128 to arrest further movement.

When the interconnected relationship has been established, pressure fluid to the cylinder 84 is relaxed so that the rocker arms 76 and 78 are free to rotate in the opposite direction to drop the lift bar 92. Thus the load is transferred from the lift bar to the locking pins which thereafter carry the load of the connected trailer.

When it is desired thereafter to disengage the trailer from the gooseneck and to lower the front end of the trailer to the ground, pressure fluid is again introduced into cylinder 84 to raise the lift bar 92 into engagement with the hook end of the outer horns, thereby to lift the trailer off the lock pins 64 to free the lock pins for removal from extended to retracted positions. Such removal is effected, when the pins are free, by pressure fluid operating in cylinder 112 to extend the piston rod 116 whereby the bell crank lever 105 is rocked in a counterclockwise direction about its pivot. Thereafter, the fluid cylinders 84 are operated to effect gradual withdrawal of the piston rod 88 for rocking movement of the rocker arms 76 and 78 about their pivots to lower the lifting bar 92 which gradually lowers the front end of the trailer until it comes to rest on the ground. Thereafter, with the lift bar free of the horns, the tractor can be moved forwardly away from the trailer.

It will be understood that instead of the air or fluid operated motor 84–88 for actuation of the rocker arms 76 and 78, other power operated means can be employed such as a winch or cable having one end attached to the rocker arms while the other end is wound about a drum rotatably supported on the tractor and connected to the tractor motor or other motor means for rotation of the drum to take up the cable for raising the rocker arms. Mere release of the cable by rotation of the drum in the opposite direction to let out cable will be sufficient to enable the rocker arms to be rocked toward lowered position by reason of the static weight of the elements resting thereon.

It will be apparent from the foregoing that we have provided a simple and efficient means wholly contained within the trailer and gooseneck for raising the trailer and for effecting an inner connection between the trailer and gooseneck and for disengaging the trailer and gooseneck and lowering the trailer onto the ground.

It will be understood that changes may be made in the details of construction, arrangement, and operation without departing from the spirit of the invention.

We claim:
1. Means for removably interconnecting the forward end portion of a trailer to the rearward end portion of a gooseneck having laterally spaced apart upright members comprising rocker arm means mounted between the upright members at the lower end portions thereof for rocking movement about a horizontal axis between raised and lowered positions, power means mounted so as to extend downwardly between said upright members for actuation of said rocker arm means about the horizontal axis between raised and lowered positions, a lift bar on the end portion of said rocker arm means for displacement between raised and lowered positions with said rocker arm means, anchoring means on the rearward end portion of said uprights spaced rearwardly from said lift bar and in position to engage the forward end portion of the trailer to limit relative upward movement of the trailer and relative downward movement of the uprights when in engaged position, outer horns extending forwardly from the forward end portion of the trailer in laterally spaced apart relation, downwardly facing hook sections in the forward end portions of the horns in the path of the lift bar when the anchoring means on the gooseneck is in engagement with the trailer whereby, when the rocker arm means are rocked in the direction to raise the lift bar, the latter comes into engagement with the hook means on the horns to raise the forward end portion of the trailer, and means for releasably interlocking the trailer and gooseneck when the trailer is in raised position.

2. Means for interconnecting a trailer and gooseneck as claimed in claim 1 in which the anchoring means on the uprights comprises shoe plates extending rearwardly from the rearward edge of the uprights.

3. Means for interconnecting a trailer and gooseneck as claimed in claim 2 in which the shoe plates comprise horizontally disposed plate members extending rearwardly from the rearward edge of the uprights at a level corresponding to the level of the bed of the forward end portion of the trailer from the ground while it rests on the ground.

4. Means for interconnecting a trailer and gooseneck as claimed in claim 3 in which the shoe plate includes a curvilinear upturned rearward end portion for guiding the plates onto the trailer end portion.

5. Means for interconnecting a trailer and gooseneck as claimed in claim 1 in which the rocker arm means comprises a pair of rocker arms laterally spaced apart by an amount less than the length of the lift bar.

6. Means for interconnecting a trailer and gooseneck as claimed in claim 1 in which the rocker arm means comprises a rocker arm having one arm portion extending rearwardly beyond the pivot and another arm portion extending forwardly of the pivot with the lift bar secured to the forwardly extending arm portion and which includes an operative connection between the power means and the portion of the rocker arm extending rearwardly of the pivot.

7. Means for interconnecting a trailer and gooseneck as claimed in claim 1 in which the power means is carried by the gooseneck and comprises a pressure fluid operated piston and cylinder assembly one of which is pivotally connected to the gooseneck while the other of which is pivotally connected to the rocker arm.

8. Means for interconnecting a trailer and gooseneck as claimed in claim 1 in which the horns are laterally spaced apart by an amount corresponding to the length of the lift bar.

9. Means for removably interconnecting the forward end portion of a trailer to the rearward end portion of a gooseneck having laterally spaced apart upright members comprising rocker arm means mounted between the upright members for rocking movement about a horizontal axis between raised and lowered positions, power means for actuation of said rocker arm means about the horizontal axis between raised and lowered positions, a lift bar on the end portion of said rocker arm means for displacement between raised and lowered positions with said rocker arm means, anchoring means on the rearward end portion of said uprights spaced rearwardly from said lift bar and in position to engage the forward end portion of the trailer to limit relative upward movement of the trailer and relative downward movement of the uprights when in engaged position, outer horns extending forwardly from the forward end portion of the trailer in laterally spaced apart relation, downwardly facing hook sections in the forward end portions of the horns in the path of the lift bar when the anchoring means on the gooseneck is in engagement with the trailer whereby, when the rocker arm means are rocked in the direction to raise the lift bar, the latter comes into engagement with the hook means on the horns to raise the forward end portion of the trailer, means for releasably interlocking the trailer and gooseneck when the trailer is in raised position, and including a pair of inner horns extending forwardly from the forward end portion of the trailer in spaced parallel relation with said outer horns.

10. Means for interconnecting a trailer and gooseneck as claimed in claim 9 in which the inner horns are spaced one from the other by an amount slightly less than the spaced relationship between the gooseneck uprights so that the gooseneck uprights will be disposed between the inner and outer horns of the trailer when in the interconnecting relation.

11. Means for interconnecting a trailer and gooseneck as claimed in claim 9 in which the inner horns are dimensioned to have a length less than the length of the outer horns whereby the inner horns will be out of the path of the lift bar.

12. Means for removably interconnecting the forward end portion of a trailer to the rearward end portion of a gooseneck having laterally spaced apart upright members comprising rocker arm means mounted between the upright members for rocking movement about a horizontal axis between raised and lowered positions, power means for actuation of said rocker arm means about the horizontal axis between raised and lowered positions, a lift bar on the end portion of said rocker arm means for displacement between raised and lowered positions with said rocker arm means, anchoring means on the rearward end portion of said uprights spaced rearwardly from said lift bar and in position to engage the forward end portion of the trailer to limit relative upward movement of the trailer and relative downward movement of the uprights when in engaged position, outer horns extending forwardly from the forward end portion of the trailer in laterally spaced apart relation, downwardly facing hook sections in the forward end portions of the horns in the path of the lift bar when the anchoring means on the gooseneck is in engagement with the trailer whereby, when the rocker arm means are rocked in the direction to raise the lift bar, the latter comes into engagement with the hook means on the horns to raise the forward end portion of the trailer, means for releasably interlocking the trailer and gooseneck when the trailer is in raised position, and wherein said horns are laterally spaced one from the other by an amount slightly greater than the spaced relationship between said gooseneck uprights whereby the latter will be disposed adjacent the inner surface of the horns in the interconnecting relationship.

13. Means for interconnecting a trailer and gooseneck as claimed in claim 12 in which the means for releasably interlocking the trailer and gooseneck comprises openings extending in crosswise alignment through the inner and outer horns and similar openings extending crosswise through the uprights with the openings through the horns and uprights adapted to be in crosswise alignment when the front end of the trailer is raised to interconnecting position, pin means in crosswise alignment with the openings through the horns and mounted for displacement laterally between retracted position and extended position with the pins extending through the openings of the inner and outer horns and the openings through the uprights therebetween when in extended position, and means for actuating the pin means between extended and retracted positions.

14. Means for removably interconnecting the forward end portion of a trailer to the rearward end portion of a gooseneck having laterally spaced apart upright members comprising rocker arm means mounted between the upright members for rocking movement about a horizontal axis between raised and lowered positions, power means for actuation of said rocker arm means about the horizontal axis between raised and lowered positions, a lift bar on the end portion of said rocker arm means for displacement between raised and lowered positions with said rocker arm means, anchoring means on the rearward end portion of said uprights spaced rearwardly from said lift bar and in position to engage the forward end portion of the trailer to limit relative upward movement of the trailer and relative downward movement of the uprights when in engaged position, outer horns extending forwardly from the forward end portion of the trailer in laterally spaced apart relation, downwardly facing hook sections in the forward end portions of the horns in the path of the lift bar when the anchoring means on the gooseneck is in engagement with the trailer whereby, when the rocker arm means are rocked in the direction to raise the lift bar, the latter comes into engagement with the hook means on the horns to raise the forward end portion of the trailer, means for releasably interlocking the trailer and gooseneck when the trailer is in raised position, comprising openings extending crosswise through said outer horns and similar openings extending crosswise through said upright members with said openings in said horns and said upright members positioned to be in crosswise alignment one with the other when the front end of the trailer is raised to interconnecting position, pin means carried by the trailer in crosswise alignment with the openings through said horns and mounted for lateral displacement between a retracted position free of said openings and extended position through the aligned openings of said outer horns and said upright members, and means for actuation of said pin means between said extended and retracted position.

15. Means for interconnecting a trailer and gooseneck as claimed in claim 14 in which the means for actuation of the pin means comprises a bell crank lever pivoted intermediate its ends for rocking movement between extended and retracted positions, an operative connection between one end portion of the bell crank lever and the pin means, and power means operatively connected to the other end portion of the bell crank lever for actuation thereof between extended and retracted positions.

16. Means for interconnecting a trailer and gooseneck as claimed in claim 15 in which the power means comprises a piston and cylinder arrangement one of which is pivotally connected to the tractor while the other is pivotally connected to the other end portion of the bell crank lever.

17. Means for interconnecting a trailer and gooseneck as claimed in claim 15 which includes an elongate guide tube in registry with the openings through the horns and dimensioned slidably to receive the pin therein for guided movement between extended and retracted positions, and an elongate slot through one wall of the tube for passage of the end portion of the lever arm therethrough during actuation of the pin means between extended and retracted positions.

18. Means for interconnecting a trailer and gooseneck as claimed in claim 17 which includes a stop rigid with the trailer frame in the path of the lever arm in position to be engaged by the lever arm when in extended position.

19. Means for removably interconnecting the forward end portion of a trailer to the rearward end portion of a gooseneck having laterally spaced apart upright members comprising rocker arm means mounted between the upright members for rocking movement about a horizontal axis between raised and lowered positions, power means for actuation of said rocker arm means about the horizontal axis between raised and lowered positions, a lift bar on the end portion of said rocker arm means for displacement between raised and lowered positions with said rocker arm means, anchoring means on the rearward end portion of said uprights spaced rearwardly from said lift bar and in position to engage the forward end portion of the trailer to limit relative upward movement of the trailer and relative downward movement of the uprights when in engaged position, outer horns extending forwardly from the forward end portion of the trailer in laterally spaced apart relation, downwardly facing hook sections in the forward end portions of the horns in the path of the lift bar when the anchoring means on the gooseneck is in engagement with the trailer whereby, when the rocker arm means are rocked in the direction to raise the lift bar, the latter comes into engagement with the hook means on the horns to raise the forward end portion of the trailer, means for releasably interlocking the trailer and gooseneck when the trailer is in raised position, and wherein each upright includes a recessed portion in the rearward edge thereof positioned to receive and retain a forward end portion of the trailer when the trailer and gooseneck are properly aligned for interconnection.

20. Means for removably interconnecting the forward end portion of a trailer to the rearward end portion of a gooseneck having laterally spaced apart upright members comprising rocker arm means mounted between the upright members for rocking movement about a horizontal axis between raised and lowered positions, power means for actuation of said rocker arm means about the horizontal axis between raised and lowered positions, a lift bar on the end portion of said rocker arm means for displacement between raised and lowered positions with said rocker arm means, anchoring means on the rearward end portion of said uprights spaced rearwardly from said lift bar and in position to engage the forward end portion of the trailer to limit relative upward movement of the trailer and relative downward movement of the uprights when in engaged position, outer horns extending forwardly from the forward end portion of the trailer in laterally spaced apart relation, downwardly facing hook sections in the forward end portions of the horns in the path of the lift bar when the anchoring means on the gooseneck is in engagement with the trailer whereby, when the rocker arm means are rocked in the direction to raise the lift bar, the latter comes into engagement with the hook means on the horns to raise the forward end portion of the trailer, means for releasably interlocking the trailer and gooseneck when the trailer is in raised position, and wherein each of said horns has a forward edge tapered upwardly and forwardly from the lower edge portion and terminating in the downwardly facing hook section.

References Cited

UNITED STATES PATENTS

| | | | |
|---|---|---|---|
| 2,545,584 | 3/1951 | Meadows. | |
| 2,667,282 | 1/1954 | Parker | 214—506 |
| 2,707,062 | 4/1955 | Parker | 214—506 |
| 3,043,609 | 7/1962 | Talbert. | |

LEO FRIAGLIA, Primary Examiner

U.S. Cl. X.R.

214—506